United States Patent [19]

Johnson, Jr. et al.

[11] 4,106,392
[45] Aug. 15, 1978

[54] HAND-OPERATED PUMP

[75] Inventors: Arthur L. Johnson, Jr.; Marlow W. Dodge, both of Rockford, Ill.

[73] Assignee: Johnson Enterprises, Inc., Rockford, Ill.

[21] Appl. No.: 765,078

[22] Filed: Feb. 3, 1977

[51] Int. Cl.² ............................ F16J 1/10; B67D 5/42; F04B 21/04
[52] U.S. Cl. .................................. 92/128; 417/511; 92/165 R; 222/402
[58] Field of Search ............ 417/437, 511, 566; 92/128, 165 R, 168; 222/391, 384, 401, 402

[56] References Cited

U.S. PATENT DOCUMENTS

| | | | |
|---|---|---|---|
| 1,725,318 | 8/1929 | Thayer | 417/437 |
| 2,138,605 | 11/1938 | Landis | 417/566 |
| 2,383,422 | 8/1945 | Singleton | 417/437 |
| 2,534,286 | 12/1950 | Martzen | 220/17 |
| 2,575,508 | 11/1951 | Balletto | 417/437 |
| 3,006,282 | 10/1961 | Sisson | 92/168 |
| 3,124,080 | 3/1964 | Sisson | 92/168 |
| 3,136,230 | 6/1964 | Buckley | 92/165 R |
| 3,391,645 | 7/1968 | Koza | 417/566 |
| 3,722,374 | 3/1973 | Densmore | 92/128 |

FOREIGN PATENT DOCUMENTS 1,346,940  9/1971  United Kingdom ............ 417/566

*Primary Examiner*—William L. Freeh
*Attorney, Agent, or Firm*—Leydig, Voit, Osann, Mayer & Holt, Ltd.

[57] ABSTRACT

A hand-operated pump includes a cylinder and a reciprocating plunger. The plunger is made from plastic and includes a piston, a stem and an enlarged hand grip which are all molded integrally with one another so as to form a one-piece unit. The end of the cylinder is closed by a pair of separable caps which are adapted to be slipped sidewise onto the plunger and attached to the cylinder after the plunger has been assembled with the cylinder.

5 Claims, 3 Drawing Figures

HAND-OPERATED PUMP

BACKGROUND OF THE INVENTION

This invention relates to a pump and, more particularly, to a hand-operated reciprocating pump of the type which is used to pressurize beer barrels or to inflate objects such as vehicle tires or play equipment. Such a pump usually includes a cylinder which slidably receives a reciprocable plunger having a piston telescoped into the cylinder, an elongated stem connected to the piston, and an enlarged hand grip connected to the outer end of the stem.

SUMMARY OF THE INVENTION

The general aim of the present invention is to provide a simpler and less expensive pump of the foregoing character by molding the plunger from plastic and by forming the piston, stem and hand grip of the plunger as a one-piece, integral unit.

Another object is to provide a pump whose cylinder is equipped with a unique cap construction which closes off the end of the cylinder while enabling the one-piece plunger to be assembled with the cylinder.

In a more detailed sense, the invention resides in a pump having a cylinder which telescopically receives a one-piece plunger annd which is closed by a pair of separable caps adapted to be slipped sidewise onto the plunger and attached to the cylinder after the plunger has been assembled with the cylinder.

These and other objects and advantages of the invention will become more apparent from the following detailed description when taken in conjunction with the accompanying drawings.

DETAILED DESCRIPTION OF THE PREFERRED EMBODIMENT

Figure 1:
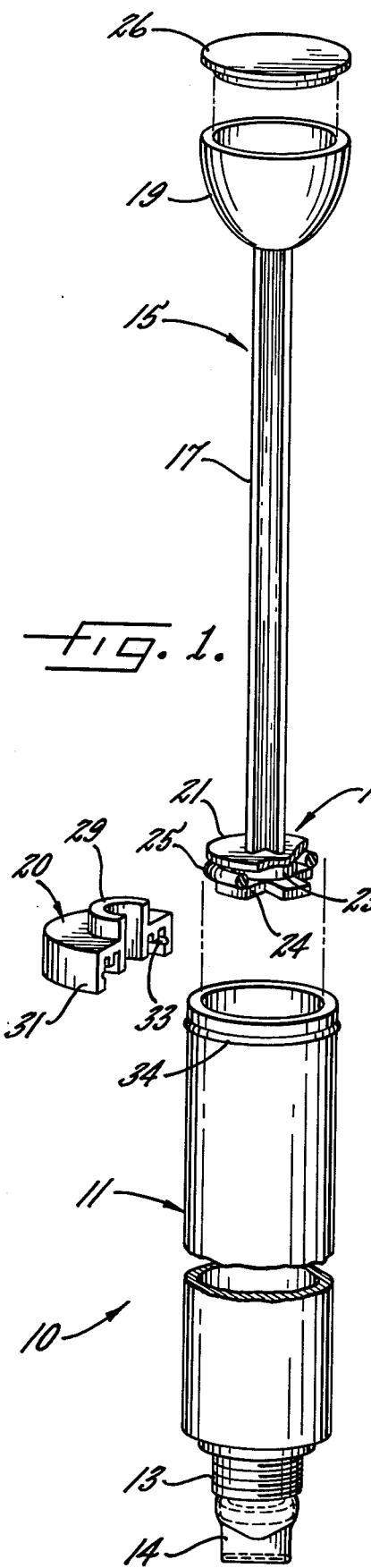
FIG. 1 is an exploded perspective view of a new and improved pump incorporating the unique features of the present invention.

As shown in the drawings for purposes of illustration, the invention is embodied in a hand-operated pump 10 of the reciprocating type and of the type which is often used to pump draft beer from a barrel. The pump, however, is not limited to this function and can be used to inflate various articles or for various other purposes.

Herein, the pump 10 includes a cylinder 11 which is preferably molded from plastic. A threaded outlet nipple 13 is molded integrally with the lower end of the cylinder and is used to attach the pump to the beer barrel. An elastomeric "duck bill" sleeve 14 is telescoped over the lower end of the nipple and serves as a check valve to permit air to be ejected from the cylinder but to prevent beer and air in the barrel from flowing into the cylinder.

In addition to the cylinder 11, the pump 10 includes a plunger 15 which is adapted to be reciprocated manually to pressurize air in the lower end of the cylinder and to force such air out of the cylinder. The plunger comprises a piston 16 telescoped into the cylinder, a stem 17 connected to the piston and extending out of the upper end of the cylinder, and an enlarged hand grip 19 which is attached to the upper end of the stem and which enables the plunger to be grabbed and manually reciprocated.

In accordance with the present invention, the piston 16, the stem 17 and the hand grip 19 of the plunger 15 are all molded integrally with one another from a suitable plastic material so as to provide a simple and inexpensive plunger. Moreover, the upper end of the cylinder 11 is closed by a pair of separable caps 20 which may be placed around the stem and attached to the cylinder after the plunger has been assembled with the cylinder.

More specifically, the piston 16 of the plunger 15 includes an upper circular disc 21 which is connected by a short cylindrical neck 23 to a cross-shaped plate 24, the disc, the neck and the plate being an integrally molded unit. An elastomeric O-ring 25 is sandwiched between the disc 21 and the plate 24 and loosely encircles the neck 23. The O-ring serves as a check valve in that it allows air to escape from the upper end portion of the cylinder 11 and into the lower end portion thereof when the plunger is shifted upwardly and then seals against the wall of the cylinder and causes such air to be compressed when the plunger is shifted downwardly.

The disc 21 of the piston 16 has a diameter just slightly smaller than the inside diameter of the cylinder 11 while the diameter of the stem 17 is approximately one-half that of the disc. The stem is molded integrally with the upper side of the disc and is generally cross-shaped in cross-section.

As shown in FIG. 1, the hand grip 19 is molded integrally with the upper end of the stem 17 and is shaped much like a goblet. The hand grip preferably is hollow in order to save material and has a diameter which is approximately three times as great as the diameter of the stem. If desired, a plastic cap 26 may be snapped within or cemented to the upper end of the hand grip to close off the latter.

Figure 2:
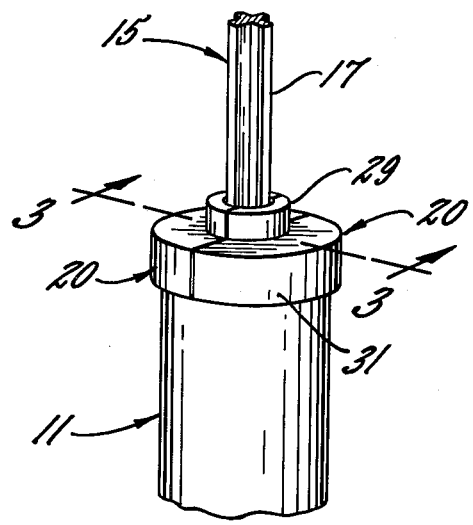
FIG. 2 is a perspective view of part of the pump.
Figure 3:
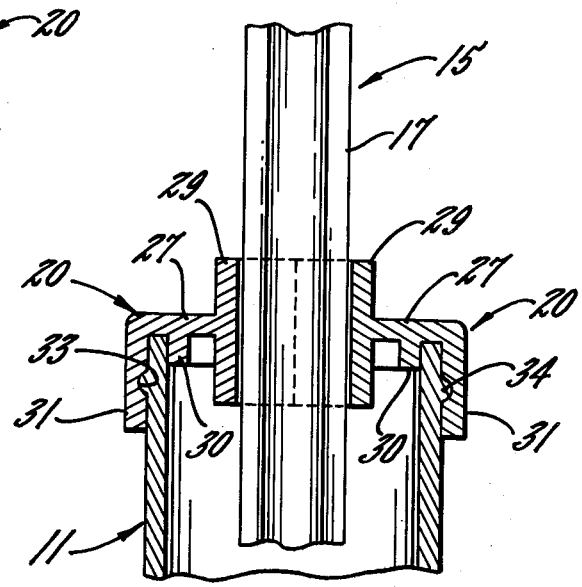
FIG. 3 is an enlarged fragmentary cross-section taken substantially along the line 3—3 of FIG. 2.

Since the piston 16 and the hand grip 19 are molded integrally with the stem 17, it is not possible to slip a cylinder cap axially onto the stem. The novel end caps 20, however, are capable of being slipped radially onto the stem and then attached to the cylinder 11 after the piston and the lower end portion of the stem have been telescoped into the cylinder. As shown in FIGS. 1 and 2, each end cap is substantially semi-circular and includes a flat wall 27 molded integrally with an annular collar portion 29 which projects both above and below the top wall. Inner and outer circumferentially extending skirts 30 and 31 (FIG. 3) are molded integrally with and depend from the top wall with the spacing between the skirts being approximately equal to the wall thickness of the cylinder 11. A circumferential groove 33 is formed around the inner side of the outer skirt and is adapted to receive a complemental rib 34 formed around the upper end of the cylinder. The rib coacts with the grooves to hold the caps 20 on the cylinder with a snap fit.

With the foregoing arrangement, the plunger 15 is assembled with the cylinder 11 by slipping the piston 16 and the lower end of the stem 17 into the cylinder. The two end caps 20 then are slipped radially or sidewise onto the stem just above the upper end of the cylinder and thereafter are pressed downwardly to cause the inner skirts 30 to telescope into the cylinder and to cause the outer skirts 31 to telescope over the cylinder. As an incident to such telescoping, the lower end portions of the outer skirts 31 cam past the rib 34 to cause the skirts to flex outwardly and thereafter the skirts snap inwardly to cause the grooves 33 to embrace the rib and prevent axial removal of the caps. In the assembled position of the caps, the inner skirts 30 engage the inside of the cylinder 11 to prevent the caps from being removed radially from the cylinder and, in addition, the collar portions 29 loosely embrace the stem 17 so as to guide the latter when the plunger 15 is reciprocated.

We claim:

1. A pump comprising a cylinder having inner and outer ends, an outlet at the inner end of said cylinder, a plunger extending into said cylinder from the outer end thereof, said plunger being formed of plastic and comprising (a) a piston telescoped slidably into said cylinder, (b) an elongated stem molded integrally with said piston and extending outwardly from said cylinder, and (c) an enlarged hand grip molded integrally with the outer end of said stem, and means covering the outer end of said cylinder, said means comprising first and second substantially semi-circular caps telescoped with said cylinder and telescopically receiving said stem.

2. A pump as defined in claim 1 in which each of said caps includes inner and outer depending skirts respectively telescoped into and over said cylinder.

3. A pump as defined in claim 2 in which each of said caps includes a collar portion located radially inwardly of said inner skirt and serving to guide said stem.

4. A pump as defined in claim 2 further including means on one of the skirts of each cap and engaging said cylinder with a snap fit to prevent said cap from separating axially from said cylinder.

5. A pump as defined in claim 4 further including a rib extending circumferentially around the outer side of said cylinder adjacent the outer end thereof, said last mentioned means comprising a circumferentially extending groove formed in the inner surface of the outer skirt of each cap and receiving said rib.

* * * * *